United States Patent [19]
Kondo

[11] Patent Number: 5,542,736
[45] Date of Patent: Aug. 6, 1996

[54] AUXIALIARY OPENING-CLOSING MECHANISM FOR AN AUTOMOBILE DOOR

[76] Inventor: Takashi Kondo, 104-2 Tsubakikouge, Tsuyama-shi, Okayama-ken, Japan

[21] Appl. No.: 362,146

[22] Filed: Dec. 22, 1994

[30] Foreign Application Priority Data

Jun. 17, 1994 [JP] Japan .................................. 6-159562

[51] Int. Cl.⁶ .................................................. B60J 1/20
[52] U.S. Cl. ............................................ 296/152; 74/512
[58] Field of Search ....................... 296/146.1, 152, 296/146.5, 146.7, 146.9; 74/512

[56] References Cited

U.S. PATENT DOCUMENTS 2,019,674  11/1935  Graebner ........................... 296/152 X
2,633,377  3/1953  Schostal ............................. 296/152 X
3,666,315  5/1972  Reimann ............................ 296/152 X
4,819,984  4/1989  Wylie .................................. 296/152

FOREIGN PATENT DOCUMENTS 4041978842  7/1992  Japan ................................ 296/146.7

Primary Examiner—Joseph D. Pape
Attorney, Agent, or Firm—Kanesaka & Takeuchi

[57] ABSTRACT

An auxiliary opening-closing mechanism for an automobile door is basically formed of a concave portion for receiving at least a part of a foot of a user and a stopper for engaging an upper portion of the foot. The concave portion is provided at a lower portion of and inside the door. The stopper has a belt-shape and is provided over the concave portion.

3 Claims, 3 Drawing Sheets

AUXILIARY OPENING-CLOSING MECHANISM FOR AN AUTOMOBILE DOOR

BACKGROUND OF THE INVENTION AND RELATED ART STATEMENT

The present invention relates to an auxiliary opening-closing mechanism of a door for facilitating a passenger to safely get off an automobile or car by adjusting an angle of the door to be opened by a person's foot when the person gets off.

Generally, a door of a car is constructed to be opened by pulling a handle, so that a passenger can get off the car. However, when the door is opened while watching safety around the car, an area where the opening and closing of the door can be controlled is limited to an area where the passenger's hand can reach. Thus, in case the door has to be opened widely, the car is inconvenient. Of course, if the door is strongly pushed by hand, the -door can be opened widely. However, since the door can not be controlled when the passenger's hand does not reach the door, there may be a possibility of danger.

Especially, for a person who can not properly control the door by hand, there is a problem when the person gets off the car. Also, it is true in case of a car having a lower height, such as a sport car.

Therefore, it is an object of the present invention to provide a mechanism for smoothly controlling a door of a car for an area where a person's hand does not reach when the door of the car is opened.

Further objects and advantages of the invention will be apparent from the following description of the invention.

SUMMARY OF THE INVENTION

Features of the invention reside in that a concave portion for receiving at least a part of a foot of a passenger is provided at a lower part of and inside a door on a side of a pivotally fixed portion of the door, and at the same time a stopper for holding a front portion of the foot which has been received in the concave portion is provided over the concave portion.

When the door is opened, a handle of the door is pulled to release a lock of the door, and then the door is opened by the person's hand to an extent where it is reached. Thereafter, the door is pushed by the person's foot held in the concave portion, so that the door can be opened for a necessary distance. To stop opening of the door, the upper front portion of the foot lodged in the concave is engaged with the stopper. If necessary, when the passenger pulls the stopper towards an inner side of the door with the upper front portion of the foot, the door is closed, so that the opening-closing of the door can be controlled.

Incidentally, after the lock of the door is released, if both hands are not available to open the door, the passenger can open the door by placing the foot in the concave portion, and pushing the door by the foot.

DETAILED DESCRIPTION OF PREFERRED EMBODIMENTS

Figure 1:
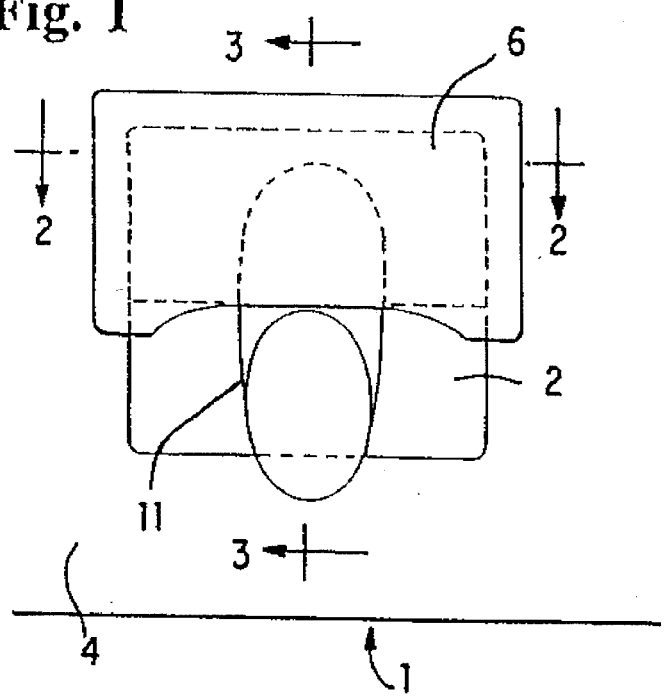
FIG. 1 is a front view of a first embodiment of the invention.

First, a first embodiment of the invention is described with reference to FIGS. 1 through 4. In the drawings, reference numeral 1 represents a front door on a right side; 2,2 are pivotally fixed portions of the door 1; and 3 is a handle. 4 is an inner lining composed of a surface skin and a cushion material. Incidentally, it goes without saying that the present invention can be applied to a front door on a left side and rear doors on both right and left sides.

Figure 3:
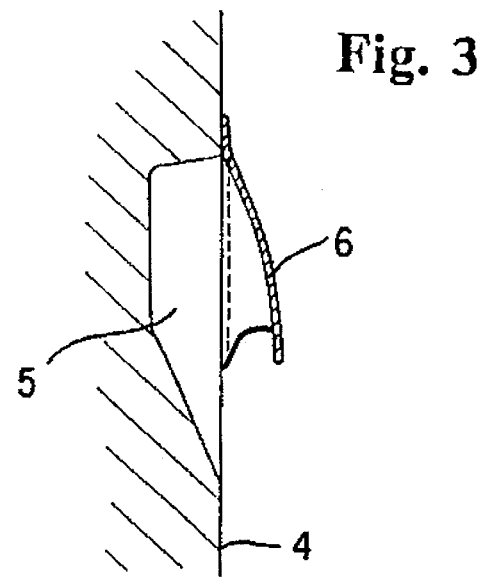
FIG. 3 is a cross section view taken along a line 3—3 in FIG. 1.
Figure 2:
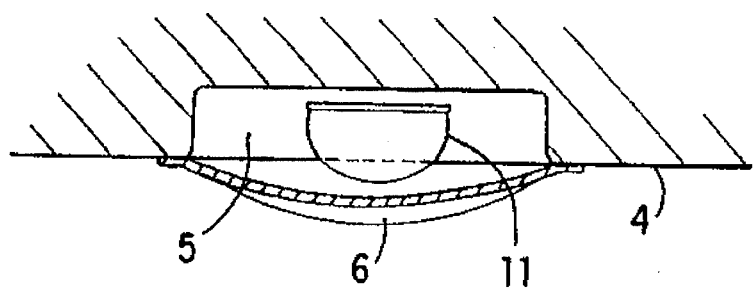
FIG. 2 is a cross section view taken along a line 2—2 in FIG. 1.
Figure 4:
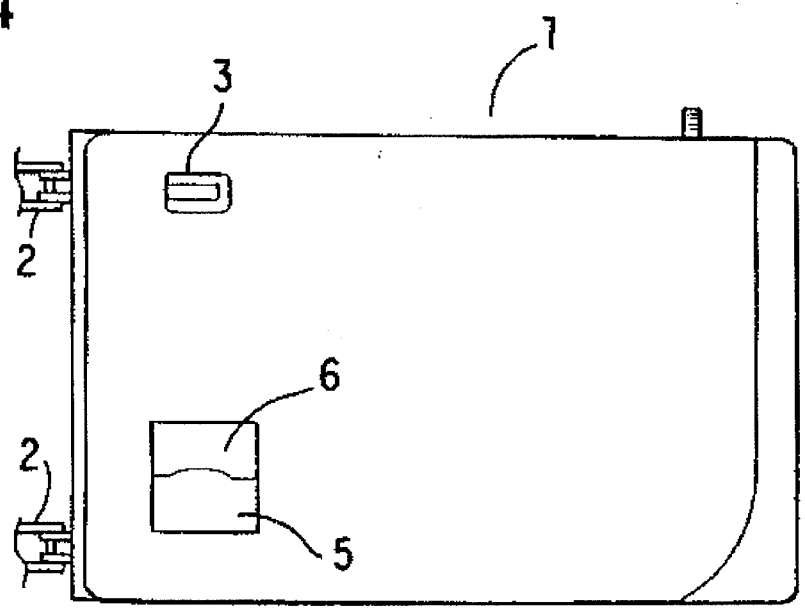
FIG. 4 is a schematic front view of a front door on a right side.

Numeral 5 is a concave portion in a rectangular box shape provided inside the door 1 at a lower portion on the side of the pivotally fixed portions 2 of the door 1. More specifically, the concave portion 5 is located at a place where a passenger's right foot can reach in a sitting state on a seat. In the embodiment shown in the drawings, since the passenger is usually wearing a shoe 11, as shown in FIG. 3, the concave portion 5 has an inclination which gradually becomes deep from a lower part towards the center in the vertical direction. Thus, one shoe 11 can easily enter the concave portion 5 from the lower part.

However, it is sufficient that the shoe 11 can enter the concave portion 5, and there is no restriction in the cross section shape of the concave portion 5. Also, there is no limitation in a size of the concave portion, but the concave portion 5 has a space so that at least one shoe 11 can be received.

Numeral 6 represents a stopper which covers an upper half of the concave portion 5. The peripheral portions of the stopper 6 are fixed to the inner lining 4 outside the concave portion 5 by an adhesive or sewing, or is screwed to a metal portion, such as a frame of the door 1. In the embodiment, the stopper 6 slightly projects outwardly to thereby facilitate the front part of the foot entering a bag-shape space formed of the concave portion 5 and the stopper 6.

The stopper 6 engages an upper side of the foot, i.e., an upper side of the shoe 11 to thereby control movement of the door 1. Therefore, it is preferable to use a material for the stopper 6 which may,have slight flexibility, but have no elasticity, such as a natural leather, artificial leather, woven cloth, hard synthetic resin plate, or metal plate. Further, a protective member, such as felt, sponge, velvet and rubber may be adhered to a back surface of the stopper 6 not to damage the shoe 11.

Figure 5:
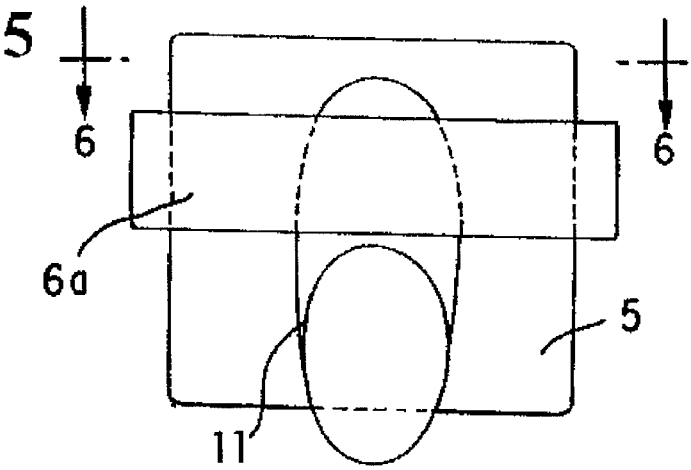
FIG. 5 is a front view of a second embodiment of the invention.
Figure 5:
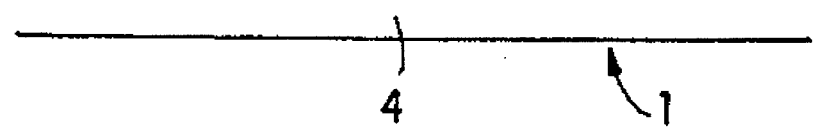
Figure 6:
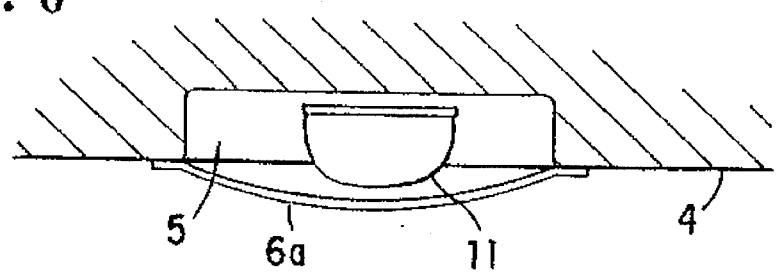
FIG. 6 is a cross section view taken along a line 6—6 in FIG. 5.
Figure 7:
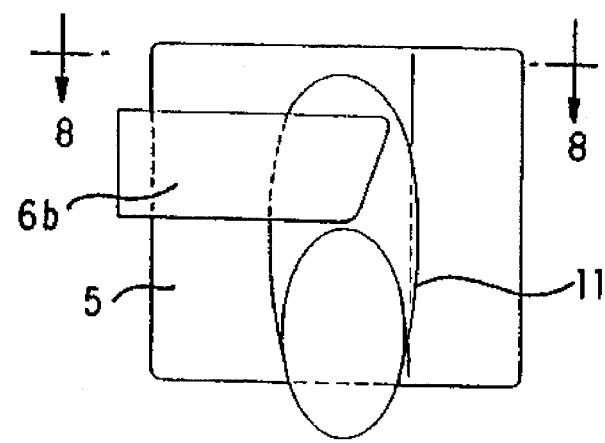
FIG. 7 is a front view of a third embodiment of the invention.
Figure 7:
Figure 8:
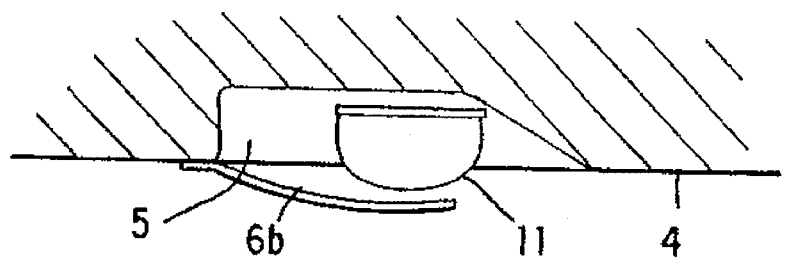
FIG. 8 is a cross section view taken along a line 8—8 in FIG. 7.

Next, other embodiments are explained. FIGS. 5 and 6 show a second embodiment, wherein a stopper 6a in a belt shape crossing the concave portion 5 is provided. FIGS. 7 and 8 show a third embodiment, wherein a short stopper 6b in a belt shape is provided, so that the shoe 11 can be easily inserted into the concave portion 5 from a side. In the latter embodiment, the concave portion 5 is gradually inclined towards the central portion from a right edge. Also, a free end of the stopper 6b extends to a position so that the shoe 11 can engage therewith when the shoe 11 is inserted into the concave portion 5. Further, since only a left end portion of the stopper 6b is fixed, the stopper 6b is formed of a material, such as a metal and a hard synthetic resin, which is not deformed when the door 1 is controlled by the upper part of the shoe 11.

Incidentally, while the concave portion 5 is formed integrally with the inner lining 4, it is also possible that a separately prepared box-shape structure is fitted into a formed concave portion 5 and fixed thereto. In this case, it is preferable that the stopper 6, 6a or 6b is fixed to an inner wall of the box-shaped structure. Also, instead of the examples shown in the drawings, the stopper 6, 6a or 6b may be fixed to the inner wall of the concave portion 5.

Since opening-closing of the door of the car can be freely controlled by the foot of the passenger to an extent where the passenger's hand can not reach, any person can easily control the door and get off the car. Also, when a hand is not available while holding luggage or other things, the door can be opened by the foot. The mechanism of the invention is especially helpful when the passenger gets off a car with a low height, such as a sport car.

Since the structure of the invention is extremely simple and expensive parts are not required, the invention can be provided at a low cost.

While the invention has been explained with reference to the specific embodiments of the invention, the explanation is illustrative and the invention is limited only by the appended claims.

What is claimed is:

1. An auxiliary opening-closing mechanism for an automobile door, comprising:

a concave portion for receiving at least a part of a foot of a user, said concave portion being formed at a lower portion of the door; and a stopper attached to the door for covering a part of the concave portion and having a short belt shape with one end fixed to the door, and a free end opposite to said one end, said stopper being engageable with an upper portion of the foot received in the concave portion so that movement of the door is controlled by the foot and a shoe can be easily inserted into the concave portion from a side of the free end.

2. An auxiliary opening-closing mechanism according to claim 1, wherein said concave portion is gradually inclined from the side of the free end of the stopper toward a central portions of the concave portion.

3. An auxiliary opening-closing mechanism according to claim 1, wherein said stopper is made of a hard material.

* * * * *